United States Patent [19]

Dean

[11] Patent Number: 4,634,047
[45] Date of Patent: Jan. 6, 1987

[54] THERMOSTATICALLY ADJUSTABLE PRESSURE REGULATOR

[75] Inventor: Raymond H. Dean, Shawnee Mission, Kans.

[73] Assignee: Tempmaster Corporation, North Kansas City, Mo.

[21] Appl. No.: 775,533

[22] Filed: Sep. 13, 1985

[51] Int. Cl.⁴ .............................................. F24F 7/00
[52] U.S. Cl. .................................. 236/49; 236/80 R; 137/86
[58] Field of Search ...................... 236/49, 80 F, 80 R, 236/87; 137/86

[56] References Cited

U.S. PATENT DOCUMENTS

| | | | |
|---|---|---|---|
| 2,918,074 | 12/1959 | Taplin | 137/86 |
| 3,266,380 | 8/1966 | Eige | 137/84 X |
| 3,373,765 | 3/1968 | McCarty | 236/80 F X |
| 3,434,409 | 3/1969 | Fragnito | 236/49 X |
| 3,661,164 | 5/1972 | Kreuter et al. | 137/86 X |
| 3,719,321 | 3/1973 | McNabney | 236/49 |
| 4,267,968 | 5/1981 | Scott | 236/49 |
| 4,331,291 | 5/1982 | Dean | 236/49 |
| 4,428,529 | 1/1984 | Bentsen | 236/49 |

*Primary Examiner*—William E. Wayner
*Attorney, Agent, or Firm*—Kokjer, Kirscher, Bradley, Wharton, Bowman & Johnson

[57] ABSTRACT

A low pressure pneumatic pressure regulator having particular application to the control circuits of system powered air distribution systems. A diaphragm separates a control chamber located above the diaphragm from an underlying output. The chambers communicate through a fixed orifice. A vent line extending from the control chamber includes an adjustable orifice which may be thermostatically controlled. An output line extending from the output chamber leads to the load controlled by the regulator. Power to operate the regulator can be supplied from the load or from a separate pressure source which connects with the output chamber through a supply port. An exhaust port which bleeds pressure from the output chamber when open is closed by the diaphragm unless the pressure differential between the chambers overcomes the diaphragm weight and possibly the added force applied by an optional spring. The pressure regulator can be used to control a number of terminal units from a common thermostat or as a pressure source for a number of terminal units each controlled by its own individual thermostat.

39 Claims, 4 Drawing Figures

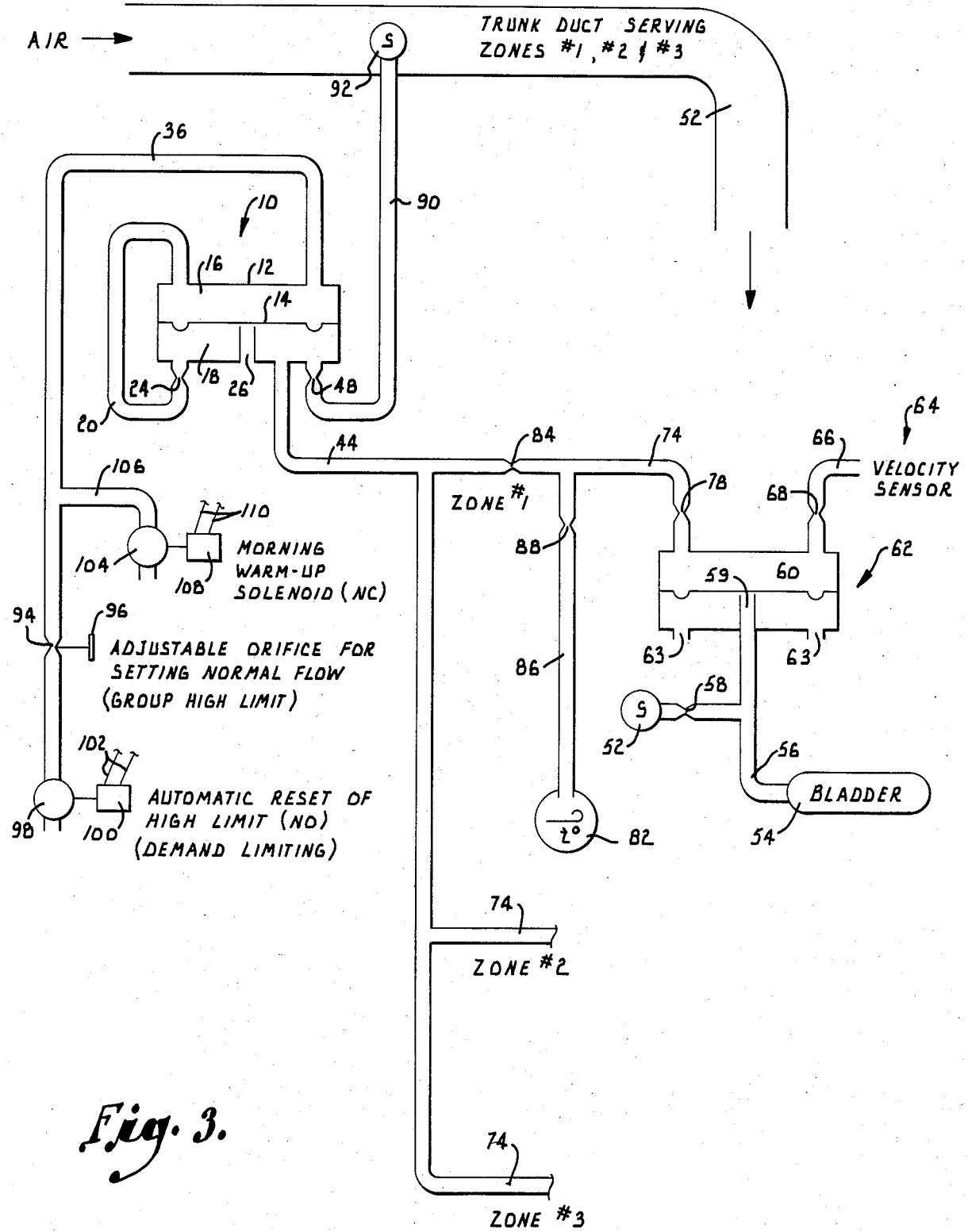

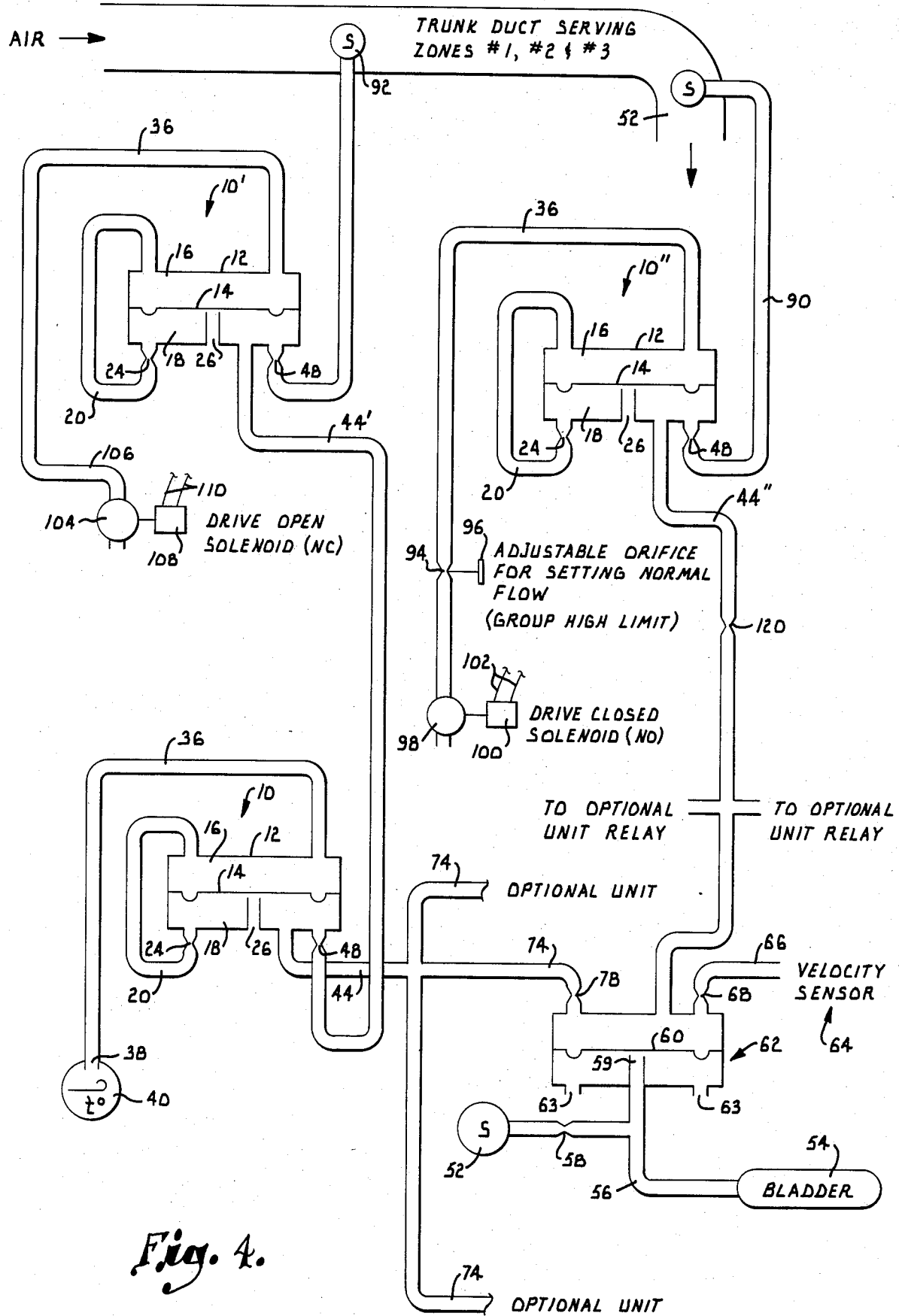

THERMOSTATICALLY ADJUSTABLE PRESSURE REGULATOR

BACKGROUND OF THE INVENTION

This invention relates generally to pressure regulators and deals more particularly with a low pressure pneumatic regulator which is especially useful in air distribution systems for the control of system powered terminal units.

Pneumatic control circuits of various types are often equipped with pressure regulators which provide a stable pressure signal that does not vary with the flow rate. In order to avoid adversely affecting the load circuit that is being controlled or powered, the pressure regulator should present a fixed low resistance to the load circuit. In many applications, it is also desirable for the pressure to be controlled thermostatically, such as when the regulator is used in air conditioning controls.

The type of pressure regulator which is most widely used includes a spring loaded diaphragm which closes against an exhaust orifice whenever the pressure on the exhaust side of the diaphragm is insufficient to overcome the spring force which opposes the exhaust side pressure. Usually, the force exerted by the spring is supplemented by the weight of the diaphragm and a backing plate which is typically attached to the diaphragm. A ball or other special device is sometimes provided instead of or in addition to the diaphragm to seal the exhaust opening. In nearly all cases, the regulated pressure is adjusted by varying the compression of the spring which urges the diaphragm toward the exhaust port. A screw or other threaded adjustment mechanism is normally provided to permit adjustment of the spring. Conventional residential gas valves have regulators of this type, as does the control device shown in U.S. Pat. No. 3,434,409 to Fragnito.

In order to adjust the spring force in a device of this type, considerable mechanical force and motion are required. Consequently, the use of a thermostat bimetal strip for setting of the pressure is impractical because it would be necessary to connect the bimetal element directly to the regulator and perhaps internally thereof. This would make the device difficult to calibrate and impractical to implement because of its physical bulk and thermal inertia. Also, the bimetal element could not be located remotely from the regulator as is usually desirable.

Thermostatically controlled regulators require operating power which is at least as high as the highest pressure that is to be transmitted to the load. If the main supply pressure is less than the maximum control pressure, the device cannot function as a regulator because the output pressure varies along with the supply pressure. In conventional pneumatic circuits, this does not present a significant problem because a compressor is provided which can supply pressures well in excess of the control pressures. However, in a system powered air conditioning control circuit of the type shown in U.S. Pat. No. 4,331,291 to Dean, the supply pressure is often rather low and can be below the pressure that might be desired as a control pressure at times when the system pressure is higher. For systems having these pressure conditions, it is desirable to use a thermostatically adjustable pressure regulator which functions effectively whenever the instantaneous supply pressure exceeds the control pressure needed at the time.

The control arrangement shown in the aforementioned Dean patent operates in an entirely satisfactory manner for the most part. However, when certain pressure conditions are present, problems can arise. For example, when the thermostat is partially closed, the state of each terminal unit is noticeably affected by variations in the duct pressure. If the duct pressure increases, the control circuit tends to close the terminal unit. Although good design of the duct system can compensate for this problem, poorly designed ducts are susceptible to disconcerting and inappropriate flow variations in individual terminal units due to system pressure fluctuations.

SUMMARY OF THE INVENTION

The present invention is directed to a low pressure pneumatic pressure regulator that is especially well suited for use with air conditioning terminal units and control circuits of the general type shown in U.S. Pat. No. 4,331,291. In accordance with the invention, a flexible diaphragm separates a control chamber from an output chamber having an exhaust port that is normally closed by the diaphragm. The control chamber communicates with the output chamber through a fixed orifice, and the control chamber is vented through an adjustable orifice which may be thermostatically controlled by a remote thermostat. The power for operating the pressure regulator can be taken either from the load that is being controlled or from a variable pressure source whose pressure is always higher than the load.

The fixed and variable orifices establish a resistive divider circuit between the output chamber and atmosphere. The control chamber is maintained essentially at atmospheric pressure when the variable orifice (thermostat) is fully open to set the minimum regulated pressure. Then, only the weight of the diaphragm opposes the output chamber pressure, and the output pressure is at a level which barely offsets the weight of the diaphragm. Consequently, the minimum regulation pressure can be very low such as 0.02–0.03 inch WG. If desired, a spring can assist the diaphragm weight in order to increase the general level of the regulated pressure. As the adjustable orifice is closed by the thermostat, the divider circuit provides positive feedback which raises the output pressure toward the maximum regulated pressure.

The regulated pressure is established by the setting of the adjustable orifice which can be controlled by a thermostat or another mechanism. The "source" resistance of the regulator which is sensed by the load is independent of the resistance of the adjustable orifice, so the circuit on the load side of the regulator is affected only by the pressure established by the adjustable orifice and not by its instantaneous resistance. The constant low resistance of the regulator output and its insensitivity to the thermostat resistance enhances the versatility of the regulator and makes it useful in a variety of different applications, especially in the control of system powered air conditioning terminal units.

DETAILED DESCRIPTION OF THE INVENTION

In the accompanying drawings which form a part of the specification and are to be read in conjunction therewith and in which like reference numerals are used to indicate like parts in the various views.

FIG. 3 is a schematic circuit diagram showing the pressure regulator installed in a pneumatic control circuit for multiple air conditioning terminal units for different spaces each controlled by its own thermostat; and FIG. 4 is a schematic circuit diagram showing the pressure regulator used in a control circuit which includes separate drive open and drive closed controls each including a pressure regulator.

Figure 1:
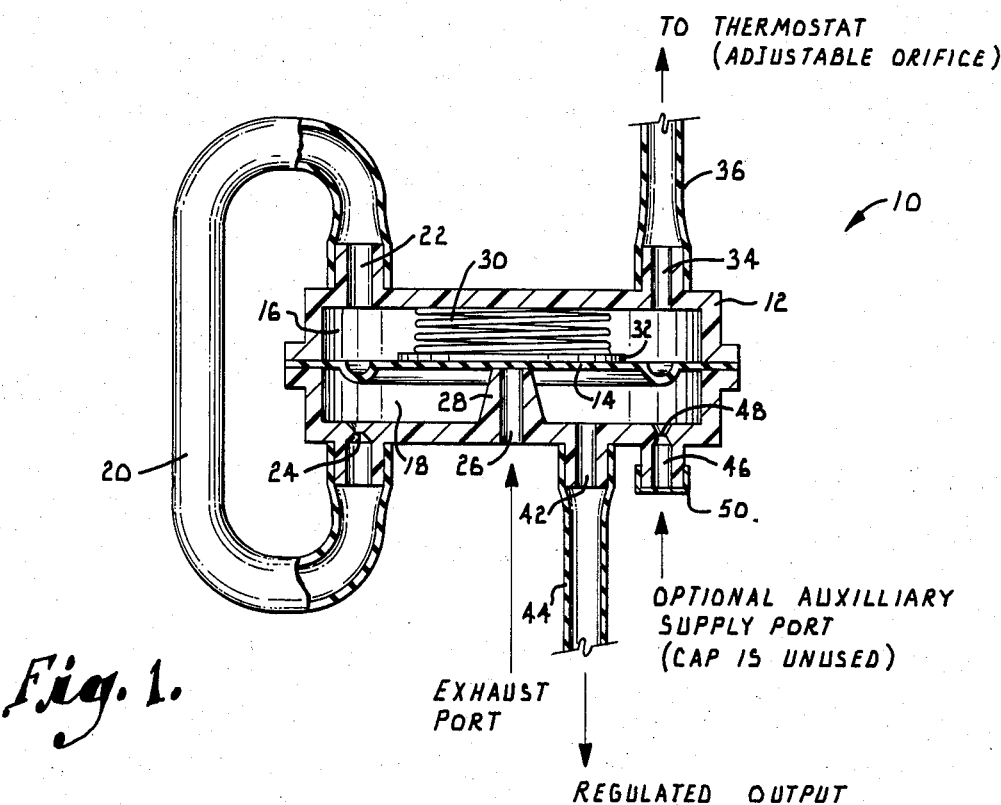
FIG. 1 is a partially sectional view of a pressure regulator constructed according to a preferred embodiment of the present invention.

Referring now to the drawings in more detail and initially to FIG. 1, numeral 10 generally designates a pressure regulator constructed in accordance with the present invention. A hollow housing 12 is provided with a flexible diaphragm 14 which separates the interior of the housing into a control chamber 16 and an output chamber 18. The diaphragm 14 has a horizontal orientation with the control chamber 16 located above the diaphragm and the output chamber 18 located below the diaphragm. The chambers 16 and 18 are equal in size and are exposed to the opposite sides of the diaphragm.

The control chamber 16 and output chamber 18 communicate with one another through a C-shaped conduit 20. One end of conduit 20 connects with a port 22 which is formed on housing 12 in communication with the control chamber 16. The opposite end of conduit 20 connects with the output chamber 18 through a fixed orifice 24 which acts to restrict the flow through conduit 20. Orifice 24 can be at either end of conduit 20 and typically has a diameter of 0.01 inch.

An exhaust port 26 is formed through a boss 28 located centrally in the output chamber 18. The top end of the exhaust port 26 is normally sealed by the diaphragm 14 which is urged by its own weight toward the exhaust port. When the diaphragm 14 is displaced upwardly to open the exhaust port 26, the exhaust port vents the output chamber 18 to the atmosphere.

Because the exhaust port 26 is located beneath diaphragm 14, the diaphragm is urged toward the exhaust port by its own weight. If desired, a coiled compression spring 30 can be provided to exert an additional force tending to close diaphragm 14 on the exhaust port 26. Spring 30 acts at its lower end against a backing plate 32 attached centrally to the top surface of diaphragm 14. Spring 30 is contained within the control chamber 16 and acts at its top end against the upper wall of housing 12.

Figure 2:
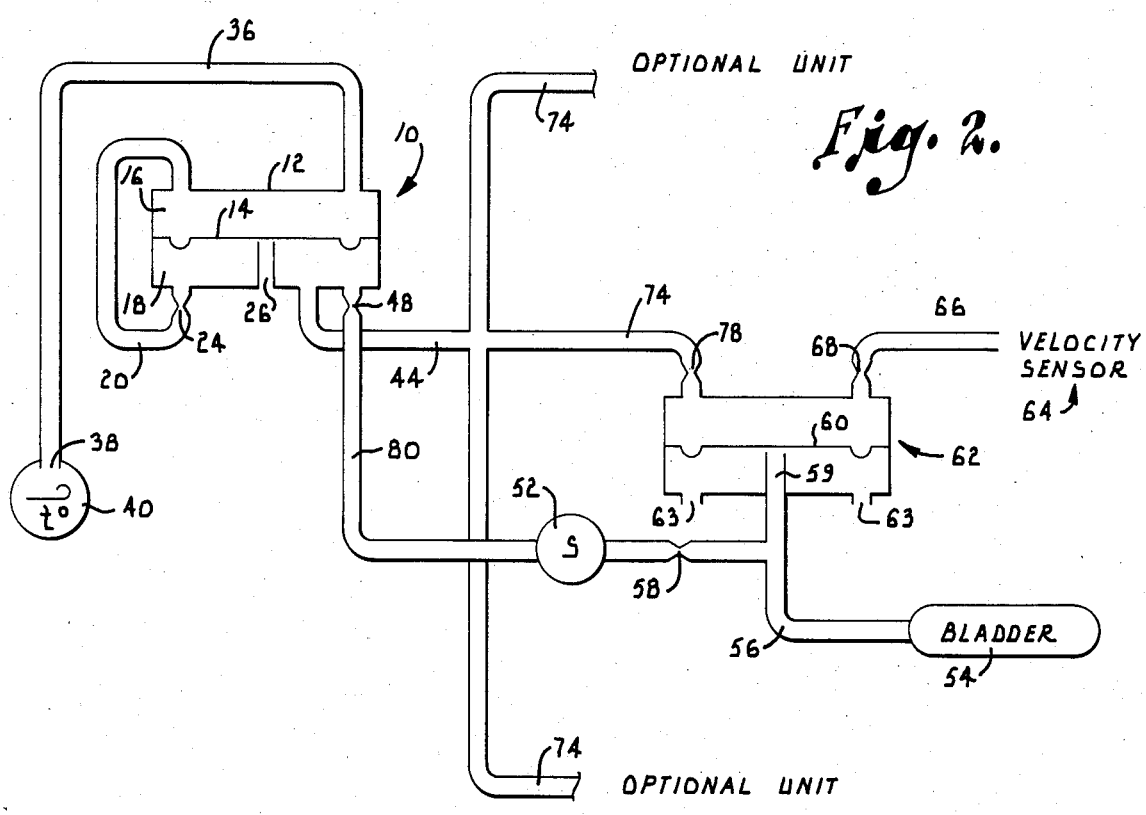
FIG. 2 is a schematic circuit diagram showing the pressure regulator incorporated in the pneumatic control circuit for multiple air conditioning terminal units for different spaces all served by a common thermostat.

The control chamber 16 has a second port 34 which connects with an elongated conduit 36 which may be a thermostat line. As shown in FIG. 2, conduit 36 is provided with an adjustable orifice 38 which may be controlled by a room thermostat 40 located remotely from the pressure regulator 10.

The output chamber 18 has an output port 42 which transmits the output chamber pressure to an output line 44. The output line 44 is a hollow conduit which transmits the regulated pressure to the load which is being controlled or powered by the regulator. The output chamber 18 may also have an auxiliary supply port 46 which connects with the output chamber through an orifice 48. If the supply port 46 is used, it connects with a supply conduit which extends from a suitable pressure source. If the supply port 46 is not used, it is closed by a suitable cap 50.

In operation, the pressure regulator 10 can be used in very low pressure applications without the compression spring 30 and backing plate 32. When the pressure regulator is unpowered, chambers 16 and 18 are at essentially the same pressure, and the weight of diaphragm 14 holds it closed on the exhaust port 26. When power is supplied, air under pressure is supplied to the output chamber 18, through line 44 from the load that is being controlled and/or through port 46 from the pressure supply. The upward force applied to diaphragm 14 by the pressure in chamber 18 is opposed by the force of the air pressure in chamber 16 and the weight of the diaphragm.

When the adjustable orifice 38 is very large compared to the fixed orifice 24, the resistance presented by the adjustable orifice 38 is much lower than that presented by the fixed orifice 24. In this circumstance, the control chamber 16 is vented to essentially atmospheric pressure. Then, the only force acting to close the exhaust port 26 is the weight of the diaphragm 14. This is a fixed force which is opposed by the pressure in the output chamber 18. The output chamber pressure builds up until it creates a force greater than the weight of the diaphragm, and the diaphragm is then displaced from its position closing the exhaust port 26. The diaphragm is held open barely enough to maintain the pressure in chamber 18 at a level equal to the weight of the diaphragm divided by the diaphragm surface area which is exposed to the output chamber 18.

Typically, the diaphragm 14 has a thickness of 0.03 inch and a density which is only slightly greater than the density of water. If the diaphragm barely closes the exhaust port in a weightless environment and is oriented horizontally so that its own weight adds to the closing force, then the regulated pressure in the output line 44 with the variable orifice 38 wide open is approximately 0.03 inch WG.

The spring 30 and backing plate 32 can be used if a higher minimum regulated pressure is desired. A typical light spring has a coil diameter of 0.3 inch, a wire diameter of 0.01 inch, six turns, and a spring constant of approximately, 0.1 pound per inch (for a steel spring). If the spring is compressed by 0.03 inch when the diaphragm is displaced from the exhaust port, the spring force applied to the diaphragm is 0.003 pounds. If the diaphragm 14 has an active surface area of one square inch exposed both to the control chamber 16 and to the output chamber 18, the closing pressure applied by spring 30 is approximately 0.08 WG. The weight of the backing plate 32 typically applies an additional closing pressure of approximately 0.03 inch WG. The combined closing pressure applied by the diaphragm 14, spring 30 and backing plate 32 is then approximately 0.14 inch WG, and the minimum regulated pressure in this situation is thus 0.14 inch WG. If higher minimum pressures are desired, stiffer springs can be used.

If the adjustable orifice 38 is fully closed (such as when the thermostat 40 is satisfied), the control chamber 16 is not vented at all through the thermostat line 36 and the pressure in the control chamber 16 is then equal to the pressure in the output chamber 18. Since there is no pressure differential acting on diaphragm 14, the weight of the diaphragm (and the force exerted by spring 30 and backing plate 32 if provided) maintains the exhaust port 26 closed. In this special circumstance, there is no pressure regulation and the output pressure in chamber 18 exactly tracks the supply pressure.

In all other cases, the adjustable orifice 38 is partially open and thus has a resistance which may be above or below that of the fixed orifice 24. There are two principal ranges of operation for the adjustable orifice 38.

A "normal control" range of operation occurs for adjustable orifice sizes ranging from fully closed up to a size slightly less than the size of fixed orifice 24. This is a range of high sensitivity to thermostat signals.

An "over-load" range of operation occurs for adjustable orifice sizes ranging from a size slightly greater than the size of the fixed orifice 24 to much greater than the size of fixed orifice 24. This is a range of low sensitivity to thermostat signals.

There is a transition region on which the effective size of the adjustable orifice is approximately equal to the size of the fixed orifice 24.

The system can be designed to utilize either of the two principal ranges of operation or the entire composite range of operation. In the preferred embodiment, the entire composite range is utilized, but the sensitivity of the bimetal of the thermostat is set so that the "normal" range only is traversed as the controlled temperature moves through its normal operating range, typically 2 or 3 degrees F. Thus, at maximum normal cooling, the effective size of the adjustable orifice 38 is slightly smaller than the fixed orifice 24, and the regulated pressure in conduit 44 is approximately 3 times higher than the minimum possible pressure described previously. As the air conditioning load decreases, the effective size of the adjustable orifice 38 decreases until the terminal unit closes off. More than the maximum normal cooling can be obtained if the effective size of the adjustable orifice rises above the size of the fixed orifice but in this range of operation, a much greater temperature change is required to produce a given change in air flow.

In any case, the fixed and adjustable orifices have effective sizes that are within an order of magnitude of one another. Consequently, when the adjustable orifice 38 is partially open, its resistance is within an order of magnitude of the resistance presented by the fixed orifice 24.

The combination of the fixed orifice 24 and adjustable orifice 38 acts as a resistive divider circuit which provides a pressure in the control chamber 16 that is equal to a particular fraction of the pressure in the output chamber 18. When power is initially applied to the pressure regulator 10, the pressure in the control chamber 16 builds up simultaneously with the pressure in the output chamber 18, although the pressure in the control chamber is always lower due to the presence of orifice 24 in conduit 20. When the pressure differential between chambers 18 and 16 is sufficient to overcome the weight of the diaphragm 14 (and the force of spring 30 and plate 32 if provided), the diaphragm is lifted slightly to crack open the exhaust port 26. The diaphragm is held open sufficiently to maintain this regulated pressure which is transmitted through the output line 44. In effect, the regulator 10 provides the regulated pressure which the thermostat circuit requires to provide a stable pressure signal independent of pressure variations in the supply system.

When the thermostat 40 is partially closed, the regulated pressure is maintained at a level between the minimum regulated pressure and the available supply pressure. If air is drained by the load to which the output line 44 connects, a supply of air must be provided at the auxiliary supply port 46. In addition, the pressure and resistance of the pressure supply must be such that it can supply at least as much air to the thermostat circuit and the load circuit as they require when the regulator 10 is maintaining its desired regulation pressure. If the load to which line 44 connects is able to supply air for powering the pressure regulator 10, there is no need for an additional air supply and cap 50 can be applied to the supply port 46. The load must supply at least as much air as the thermostat circuit requires when the regulator is maintaining its desired regulation pressure.

FIG. 2 shows schematically the pressure regulator 10 used to control a pneumatic circuit of the type disclosed in U.S. Pat. No. 4,331,291 which issued on May 25, 1982 to Raymond H. Dean and which is incorporated herein by reference. As explained in the referenced patent, conditioned air from a suitable heating or cooling unit (not shown) is supplied to a main supply duct 52 by a fan (also not shown). The conditioned air is supplied at a relatively high pressure to duct 52 and is discharged at a relatively low pressure through a terminal unit controlled by an actuator bag or bladder 54. Connected with the bladder 54 is a conduit 56 which communicates with the supply duct 52 through an orifice 58. The orifice 58 may have a diameter of 0.078 inch.

Conduit 56 terminates in a port 59 located adjacent to the lower side of a diaphragm 60 forming part of an amplifying relay 62 which is described in detail in the referenced Dean patent. Exhaust ports 63 exhaust pressure from the space below diaphragm 60. A velocity sensor 64 senses the velocity of the air which is discharged through the terminal unit and applies the air velocity signal to a conduit 66 equipped with an orifice 68. The velocity signal is applied to the top side of diaphragm 60. Orifice 68 may have a diameter of 0.01 inch.

A control line 74 forms the "thermostat line" for relay 62 and is provided with an orifice 78 which may have a diameter of 0.01 inch. Line 74 connects through orifice 78 with the top side of diaphragm 60 and connect with line 44 so that line 74 receives the regulated pressure signal. The auxiliary supply port 46 is uncapped and connected with a conduit 80 which extends from the main supply duct 52.

In the arrangement of FIG. 2, the relatively high system pressure from the main supply duct 52 is used to power the pressure regulator 10, and the pressure regulator provides a regulated output pressure on lines 44 and 74 which control relay 62. The thermostat 40 controls the regulated pressure signal in a manner that is virtually independent of the supply pressure and any fluctuations therein. The terminal unit which is controlled by bladder 54 supplies conditioned air to the space which it serves under the control of the thermostat 40.

The pressure regulator 10 can serve as the master unit in a master/slave network in which a plurality of terminal units are controlled by the thermostat 40 which is common to all of the terminal units. In the master/slave network, the output line 44 of the pressure regulator 10 connects with the lines 74 of a number of different individual terminal units (identified as "optional units" in FIG. 2) which each may serve a separate conditioned space. The constant low resistance of the output of the regulator 10 and its insensitivity to the resistance of the thermostat 40 enables all of the terminal units to function together under the control of the common thermostat. At the same time, all of the terminal units are relatively independent of variations in system pressure at any thermostat setting. The number of slave units which can be served by the common output line 44 depends directly on the minimum supply pressure in duct 52 and the size of the orifice 48 and inversely on the size of the orifices 68 and 78. Typically, up to four units are operated in such a master slave network.

FIG. 3 shows the pressure regulator 10 implemented as an adjustable pressure regulator to power the thermostat circuits of a number of individual terminal units each normally controlled by its own thermostat 82 located in the space served by the terminal unit. Each terminal unit includes an amplifying relay 62 which controls an actuator bag or bladder 54 which in turn controls the discharge of conditioned air into the space. The output line 44 of the pressure regulator 10 acts as a pressure source which connects with line 74 of the relay 62 which serves each zone. Each thermostat 82 has a thermostat line 86 which connects with line 74 at a location between orifice 78 and another orifice 84 which may have a diameter of 0.012 inch. The output line 44 is thus connected with each amplifying relay 62 in parallel with the corresponding thermostat line 86. Each thermostat line 86 is provided with an orifice 88 which may have a diameter of 0.016 inch. With the FIG. 3 configuration, the thermostat 82 should be designed so that its effective size varies from much less than the size of orifice 84 to approximately equal to the size of orifice 84 as the temperature moves through its normal control range. The conduit 56 which connects with each bladder 54 and the corresponding relay 62 is tapped into the supply duct 52 at a location near its connection with the corresponding terminal unit.

The pressure regulator 10 is supplied through a supply line 90 which connects with port 46. The supply line 90 is tapped into duct 52 at a location 92 well upstream from the terminal units which are served by the duct. At the upstream location 92, the pressure in the supply duct 52 is greater than the pressure at the terminal units downstream from location 92. Consequently, the supply pressure is always greater than the highest pressure necessary to operate a terminal unit. The number of terminal units which may be supplied by the common regulator output line 44 depends directly on the minimum pressure in duct 52 and the size of the orifice 48 and inversely on the size of the orifices 84, and is typically about 12.

Rather than being controlled by a thermostat, line 36 in the FIG. 3 configuration is normally controlled by an adjustable orifice 94 whose effective size can be manually adjusted by a suitable adjustment mechanism 96. A normally open solenoid valve 98 is arranged in series with the adjustable orifice 94 and is controlled by a solenoid 100 having electrical lines 102 which apply electrical signals to the solenoid. Another solenoid valve 104 is arranged in parallel with orifice 92 and valve 98 in a conduit 106 which connects with conduit 36 and provides a parallel vent path. Valve 104 is normally closed and is controlled by a solenoid 108 supplied by electrical lines 110.

In normal operation of the system shown in FIG. 3, valve 98 is in its normally open condition, valve 104 is in its normally closed condition, and the adjustable orifice 94 is adjusted until the output line 44 is at the desired pressure for supplying the relays 62 for the various zones served by the terminal units. Line 44 provides a constant pressure for powering the control side of relays 62, and the terminal unit served by each relay is normally controlled by the thermostat 82 in the corresponding zone. Even when the thermostats 82 are partially closed, the individual terminal units are relatively insensitive to fluctuations in the local duct pressure due to the stable regulated pressure provided on line 44. The pressure regulator 10 provides a control pressure on line 44 which is higher than normal, and the individual terminal units can be started up more easily in the morning when all of the terminal units are initially wide open and the system is therefore in a low pressure state.

Solenoid 108 and the valve 104 it controls provide a convenient and reliable means for quickly warming up the building in the morning when occupants begin to arrive. At the desired time in the morning when the quick warm up is to begin, an electrical signal is applied on lines 110 to energize solenoid 108. The solenoid then opens the normally closed valve 104, and the control chamber 16 is vented to atmosphere through valve 104 regardless of the setting of the adjustable orifice 94. Since the control chamber 16 is then essentially at atmospheric pressure, the pressure regulator 10 adjusts the output pressure applied to line 44 until it is barely high enough to maintain the diaphragm 14 open. Consequently, the output pressure from the regulator 10 is at its minimum level which can be low enough to maintain each of the bladders 54 in a fully deflated condition, regardless of the signals provided by the individual thermostats 82. In this manner, all of the terminal units served by duct 52 are maintained in the fully open condition to apply maximum quantities of warm air for quickly warming up the building in the morning. When the building has warmed up sufficiently, the signal on lines 110 is removed, and valve 104 reverts to its normally closed condition. The pressure in line 44 is then regulated in the normal manner in accordance with the setting of the adjustable orifice 94.

The orifice adjustment mechanism 96 can be normally adjusted to simultaneously reset the high limit for each of the individually controlled terminal units. This manual group high limit adjustment can be effected by adjusting the effective size of the adjustable orifice 94 until the pressure in line 44 is at the level necessary to achieve the desired airflow through the individual terminal units. This adjustment should be made with all of the thermostats 82 wide open to call for maximum airflow.

The group high limit adjustment can be accomplished automatically by applying electrical signals to lines 102 at the times automatic reset is desired. Solenoid 100 is then energized to close the normally open solenoid valve 98. Valves 98 and 104 are both closed at this time, and the control chamber 16 is not vented at all, regardless of the setting of the adjustable orifice 94. The control and output chambers 16 and 18 are then at the same pressure level, and diaphragm 14 remains closed on the exhaust port 26. The pressure in the output line 44 rises toward the duct pressure available at the location 92 where the supply line 90 is tapped into the duct 52. If the sizes of the various orifices are selected properly, the maximum airflow through each of the terminal units served by duct 52 will be reduced substantially. Intermediate settings of the maximum airflow rates through the terminals can be obtained by applying pulses to solenoid 100 to open and close valve 98, thereby controlling the regulated pressure in accordance with the pattern of the pulses that are applied to the solenoid 100.

The system of FIG. 3 can serve as part of a fire safety system. In the event of a fire on a particular floor on a building, maximum airflow can be provided to all terminals on the floors above and below the floor of the fire and the terminal units on the fire floor can be driven closed by the above-described automatic high limit adjustment. Then, the pressure on the floors above and below the fire will be greater than the pressure on the floor of the fire, thereby assisting in preventing the fire from spreading to additional floors and providing smoke control.

FIG. 4 illustrates schematically a master/slave network similar to that shown in FIG. 2, except that remote drive open and drive closed controls are provided for overriding the common thermostat 40 which normally controls the distribution of air to the spaces served by the thermostat. In the arrangement of FIG. 4, the supply line 80 is eliminated and replaced by line 44' which is the output line of a drive open pressure regulator 10' identical to the regular 10 described previously. Line 44' thus supplies operating power to regulator 10 and the control circuits it supplies. The vent line 26 of regulator 10' has a single normally closed valve 104 controlled by a solenoid 108 in a manner similar to that described in connection with FIG. 3.

The FIG. 4 circuit includes a drive closed pressure regulator 10" which has its output line 44" connected through orifices 120 with the top side of each relay 62 controlled by the system. Orifice 120 is preferably smaller than orifice 68 and 78 and may have a size of 0.007 inch. Regulator 10" is constructed in the same manner as regulator 10 and has its vent line 36 equipped with adjustable orifice 94 and normally open solenoid valve 98 controlled by solenoid 100. Operating power for regulators 10' and 10" is taken from duct 52 and applied in line 90 to the output chamber 18 of each regulator 10' and 10".

In operation of the system shown in FIG. 4, the thermostat 40 normally controls each relay 62 in the manner previously described in connection with FIG. 2. With valve 104 in its normally closed condition, vent line 36 of regulator 10' is blocked, and pressure in the control chamber 16 builds up to the level of the output chamber 18. Consequently, the exhaust port 26 is closed by diaphragm 14, and the pressure in duct 52 is transmitted from line 90 to line 44' and to regulator 10 to provide its operating power at a stable pressure level which tracks the supply duct pressure.

With valve 98 of the drive closed, regulator 10" in its normally open condition, vent line 36 of regulator 10" is vented to atmosphere to maintain the control chamber 16 at atmospheric pressure. The output chamber 18 of regulator 10" is thus maintained at its minimum pressure level which is essentially atmospheric pressure, so output line 44" is at atmospheric pressure and normally has negligible effect on the relays 62. Thus, in normal operation of the system, regulator 10' provides a stable supply pressure to regulator 10, and regulator 10" has no effect on the control exercised by thermostat 40.

In the event that a fast morning warm-up of the building is desired or all air diffusers are to be fully opened for any other reason, solenoid 108 is energized to open the normally closed valve 104. Then, vent line 36 of regulator 10' is vented to atmosphere and its control and output chambers 16 and 18 are likewise maintained essentially at atmospheric pressure. As a result, line 44' is reduced to atmospheric pressure and the output line 44 of regulator 10 is at atmospheric pressure regardless of the condition of thermostat 40. The pressure reduction above diaphragm 60 of each relay 62 causes the diaphragm to open port 59, thereby deflating each bladder 54 and fully opening each discharge register of the supply duct 52. The registers all remain open so long as solenoid 108 remains energized. When solenoid 108 is deenergized the ssytem returns to normal operation under the control of thermostat 40.

If a fire occurs or if for some other reason it is desired to cut off air to the area served by the system of FIG. 4, solenoid 100 is energized to close the normally open valve 98. This blocks vent line 36 of regulator 10" and causes its control and output chambers 16 and 18 to build up to the high pressure level which is transmitted from duct 52 in line 90 and then through chamber 18 to line 44". This high pressure is transmitted through orifices 120 to the top side of each relay 62 above its diaphragm 60. Consequently, each port 59 is closed regardless of the condition of thermostat 40 on the pressure level of line 44. Closing of each port 59 results in each bladder 54 being fully inflated and each outlet register being fully closed to cut off the air supply to the area served by the system. The registers remain closed until solenoid 100 is deenergized, at which time the system returns to normal operation under the control of thermostat 40.

In this manner, the drive open regulator 10' and drive closed regulator 10" function to override the thermostat 40 in order to drive all registers open or closed, depending upon which solenoid 108 or 100 is energized. At the same time, neither the drive open regulator 10' nor the drive closed regulator 10" interferes with the control of the air distribution system which is normally exercised by regulator 10 and the thermostat 40. It is to be understood that the drive open and drive closed capabilities are not always necessary and either one of the regulators 10' or 10" can be provided without the other because of their independence from one another.

From the foregoing, it will be seen that this invention is one well adapted to attain all the ends and objects hereinabove set forth together with other advantages which are obvious and which are inherent to the structure.

Thus, it will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A pneumatic pressure regulator comprising:

a diaphragm having opposite sides;

a substantially enclosed control chamber on one side of said diaphragm;

a substantially enclosed output chamber on the other side of said diaphragm;

a conduit providing communication between said control and output chambers, said conduit being isolated from pressure signals other than the pressure signals applied from said control and output chambers;

a flow restriction in said conduit restricting flow therethrough;

an exhaust port for exhausting pressure from said output chamber when open, said exhaust port normally being closed by said diaphragm with the pressure in said output chamber urging said diaphragm in a direction to open said exhaust port and the pressure in said control chamber urging said diaphragm in a direction to close said exhaust port;

a passage extending from said control chamber for venting same;

variable restriction means in said passage for restricting flow therethrough to an extent that is variable between a first level and a second level different from the first level; and an output line communicating with said output chamber for transmitting the pressure therein, whereby the condition of said variable restriction means establishes the pressure level in said output line.

2. A pressure regulator as set forth in claim 1, wherein:

said diaphragm has a substantially horizontal orientation;

said control chamber is located above said diaphragm;

said output chamber is located below said diaphragm; and said exhaust port is located below said diaphragm with the weight of the diaphragm normally closing same on the exhaust port.

3. A pressure regulator as set forth in claim 2, including a spring acting on said diaphragm to urge same toward said exhaust port, whereby the pressure differential between said output and control chambers must exceed the combined force of said spring and the weight of said diaphragm to open the exhaust port.

4. A pressure regulator as set forth in claim 1, wherein said variable restriction means is situated at a location remote from said control chamber.

5. A pressure regulator as set forth in claim 4, wherein said variable restriction means is controlled thermostatically.

6. A pressure regulator as set forth in claim 5, including:

a duct receiving conditioned air at a relatively high supply pressure and having an outlet for discharging the conditioned air to a space served by the duct;

a pressure responsive actuator for controlling the passage of conditioned air through said outlet;

a pneumatic control circuit for controlling said actuator and having a control line for controlling said circuit in accordance with the pressure condition of said control line; and means for connecting said output line with said control line.

7. A pressure regulator as set forth in claim 1, including:

a duct receiving conditioned air at a relatively high supply pressure and having a plurality of outlets for discharging conditioned air to different spaces served by the duct, each outlet being controlled by a pressure responsive actuator and each actuator having a pneumatic control circuit for controlling the actuator;

a pneumatic control line for each control circuit controlling same in accordance with the pressure condition of the control line;

a common thermostat for all of said spaces, said thermostat restricting said passage in accordance with the temperature sensed by the thermostat to provide said variable restriction means; and means for connecting said output line to each of said pneumatic control lines.

8. A pressure regulator as set forth in claim 1, wherein said variable restriction means comprises an adjustable orifice in said passage and means for adjusting the effective size of said orifice to adjust the resistance it offers to flow through said passage.

9. A pressure regulator as set forth in claim 1, wherein said variable restriction means includes:

a valve for opening and closing said passage; and means for opening and closing said valve.

10. A pressure regulator as set forth in claim 1, wherein said variable restriction means includes:

an adjustable orifice in said passage;

a valve in said passage arranged in series with said adjustable orifice and movable between open and closed positions; and means for selectively opening and closing said valve independently of said orifice.

11. A pressure regulator as set forth in claim 1, including:

a duct receiving conditioned air at a relatively high supply pressure and having a plurality of outlets for discharging conditioned air to different spaces served by the duct, each outlet being controlled by a pressure responsive actuator and each actuator having a pneumatic control circuit for controlling the actuator;

a thermostat line for each control circuit for normally controlling same;

a thermostat in each space for normally controlling the corresponding thermostat line; and means for connecting said output line to each control circuit in parallel with the thermostat line thereof.

12. A pneumatic pressure regulator comprising:

a diaphragm having opposite sides;

a substantially enclosed control chamber on one side of said diaphragm;

a conduit providing communication between said control and output chambers;

a flow restriction in said conduit restricting flow therethrough;

an exhaust port for exhausting pressure from said output chamber when open, said exhaust port normally being closed by said diaphragm with the pressure in said output chamber urging said diaphragm in a direction to open said exhaust port and the pressure in said control chamber urging said diaphragm in a direction to close said exhaust port;

a passage extending from said control chamber for venting same;

variable restriction means in said passage for restricting flow therethrough to an extent that is variable between a first level and a second level different from the first level;

an output line communicating with said output chamber for transmitting the pressure therein, whereby the condition of said variable restriction means established the pressure level in said output line;

a duct receiving conditioned air at a relatively high supply pressure and having a plurality of outlets for discharging conditioned air to different spaces served by the duct, each outlet being controlled by a pressure responsive actuator and each actuator having a pneumatic control circuit for controlling the actuator;

a thermostat line for each control circuit for normally controlling same;

a thermostat in each space for normally controlling the corresponding thermostat line; and means for connecting said output line to each control circuit in parallel with the thermostat line thereof.

13. A pressure regulator as set forth in claim 12, wherein said variable restriction means comprises an adjustable orifice in said passage and means for adjusting the effective size of said orifice to adjust the resistance it offers to flow through said passage.

14. A pressure regulator as set forth in claim 13, including:
a second passage arranged in parallel with the first mentioned passage;
a valve in said second passage for opening and closing same; and
means for selectively opening and closing said valve independently of said orifice.

15. A pressure regulator as set forth in claim 14, including:
a second valve in said first passage arranged in series with said adjustable orifice and movable between open and closed positions; and
means for selectively opening and closing said second valve independently of said orifice.

16. A pneumatic pressure regulator comprising:
a substantially enclosed housing;
a flexible diaphragm in said housing separating same into a control chamber above the diaphragm and an output chamber below the diaphragm;
a conduit extending between said control and output chambers and having a flow restricting orifice therein, said conduit having opposite ends coupled with the respective control and output chambers and providing a closed flow path between said opposite ends;
an exhaust port for said output chamber for exhausting pressure therefrom when open, said port being located below said diaphragm with the weight of the diaphragm closing said port unless the pressure in said output chamber exceeds the pressure in said control chamber sufficiently to overcome the weight of the diaphragm and thereby displace same from the exhaust port to open the latter;
a passage extending from said control chamber for bleeding pressure therefrom;
an adjustable orifice in said passage, said orifice presenting an effective size which is adjustable between a first size and a second size; and
an output line extending from said output chamber to transmit the regulated pressure therein.

17. A pressure regulator as set forth in claim 16, including a spring in said housing acting against said diaphragm to urge same downwardly toward the exhaust port, whereby the spring force and the weight of said diaphragm must be overcome by the pressure differential between said output and control chambers to open the exhaust port.

18. A pressure regulator as set forth in claim 16, wherein said orifice is adjustable thermostatically by a thermostat situated at a location remote from said housing.

19. A pressure regulator as set forth in claim 16, including:
a duct receiving conditioned air at a relatively high supply pressure and having an outlet for discharging the conditioned air to a space served by the duct;
a pressure responsive actuator for controlling the passage of conditioned air through said outlet;
a pneumatic control circuit for controlling said actuator and having a control line for controlling said circuit in accordance with the pressure condition of said control line; and
means for connecting said output line with said control line.

20. A pressure regulator as set forth in claim 16, including:
a duct receiving conditioned air at a relatively high supply pressure and having a plurality of outlets for discharging conditioned air to different spaces served by the duct, each outlet being controlled by a pressure responsive actuator and each actuator having a pneumatic control circuit for controlling the actuator;
a pneumatic control line for each control circuit controlling same in accordance with the pressure condition of the control line;
a common thermostat for all of said spaces, said thermostat acting to adjust the effective size of said adjustable orifice; and
means for connecting said output line to each of said pneumatic control lines.

21. A pressure regulator as set forth in claim 16, including:
a duct receiving conditioned air at a relatively high supply pressure and having a plurality of outlets for discharging conditioned air to different spaces served by the duct, each outlet being controlled by a pressure responsive actuator and each actuator having a pneumatic control circuit for controlling the actuator;
a thermostat line for each control circuit for normally controlling same;
a thermostat in each space for normally controlling the corresponding thermostat line; and
means for connecting said output line to each control circuit in parallel with the thermostat line thereof.

22. A low pressure pneumatic pressure regulator for providing a regulated low pressure signal useful in the control of a system powered control circuit for a conditioned air distribution system, said pressure regulator comprising:
a substantially enclosed housing;
a flexible diaphragm in said housing having a substantially horizontal orientation to divide the housing into a control chamber above the diaphragm and an output chamber below the diaphragm, said diaphragm having a preselected weight and a preselected surface area exposed to said chambers;
a conduit constructed and arranged to provide a closed flow path extending between said control and output chambers and having an orifice restricting flow through said conduit;
means for applying the pressure of the air distribution system to said output chamber;
an exhaust port located below said diaphragm and normally closed by said diaphragm, said port venting said output chamber when open and being open only when the output chamber pressure exceeds the control chamber pressure by at least said preselected weight of the diaphragm divided by said preselected exposed surface area;
a thermostat line extending from said control chamber and having a thermostatically controlled adjustable orifice which vents said control chamber to atmosphere when open and closes said thermostat line when closed; and
an output line extending from said output chamber to transmit said pressure signal therefrom, said output line having a pressure level substantially equal to said preselected weight of the diaphragm divided by said preselected surface area when said adjustable orifice is open.

23. A pressure regulator as set forth in claim 22, wherein the control circuit includes a control line for controlling the pressure condition of the circuit, said output line being connected with said control line.

24. In an air distribution system having a duct receiving conditioned air at a relatively high supply pressure, an outlet in said duct for discharging the conditioned air therefrom, pressure responsive actuator means for controlling the passage of air through said outlet, a pneumatic control circuit for controlling said actuator means, and a pneumatic control line for controlling said circuit, the improvement comprising:
a hollow housing separated into substantially enclosed control and output chambers by a diaphragm interposed between said chambers in the housing;
a conduit providing a closed flow path between said chambers, said conduit having a restricted orifice therein;
an exhaust port controlled by said diaphragm, said exhaust port being normally closed by the diaphragm and exhausting the pressure from said output chamber when open in response to a pressure differential between said output and control chambers in excess of a predetermined level;
a thermostat line communicating with said control chamber to bleed pressure therefrom, said thermostat line having a thermostatically controlled adjustable orifice therein controlled by a thermostat in the space served by the air distribution system; and
an output line extending from said output chamber and communicating with said pneumatic control line to transmit the output chamber pressure thereto, whereby the regulated pressure in said output chamber controls said pneumatic circuit.

25. The improvement of claim 24, wherein:
said diaphragm has a substantially horizontal orientation and presents a preselected surface area exposed to said chambers;
said control chamber is located above said diaphragm;
said output chamber is located below said diaphragm; and
said exhaust port is located below said diaphragm with the weight of the diaphragm normally closing same on the exhaust port, whereby said predetermined level of the pressure differential is the diaphragm weight divided by said preselected surface area.

26. The improvement of claim 24, including a spring acting against said diaphragm to urge same toward said exhaust port.

27. In an air distribution system having a duct receiving conditioned air at a relatively high supply pressure, a plurality of outlets in said duct for discharging the conditioned air into different spaces served by the system, a pressure responsive actuator for each outlet controlling the discharge of air therefrom, a system powered pneumatic control circuit for each actuator, and a pneumatic control line for each circuit operable to control the circuit in accordance with the pressure condition of the control line, the improvement comprising:
a pneumatic pressure regulator for applying a regulated pressure signal to the control line of each pneumatic control circuit to operate each control circuit as a slave unit controlled by said pressure regulator acting as a master unit, said pressure regulator having an enclosed housing separated into a control chamber and an output chamber by a flexible diaphragm interposed between said chambers in the housing;
a conduit extending between said chambers and having an orifice therein restricting flow through said conduit;
an exhaust port for exhausting pressure from said output chamber when open, said exhaust port being normally closed by said diaphragm and being open when the pressure differential between said output and control chambers exceeds a predetermined level sufficient to displace the diaphragm from said port;
a thermostat line extending from said control port to vent the pressure therein;
a thermostat in said thermostat line for opening and closing same under the control of the thermostat, said thermostat having a closed condition restricting flow through said thermostat line to a greater extent than flow through said conduit is restricted by said orifice and an open condition restricting flow through said thermostat line to a lesser extent than when said thermostat is in the closed condition; and
an output line communicating with said output chamber and with the control line of each control circuit, whereby the pressure in said output chamber is controlled by said thermostat and is applied to each control line to operate each control circuit as a slave unit controlled by the thermostat.

28. The improvement of claim 27, wherein:
said diaphragm has a substantially horizontal orientation and presents a preselected surface area exposed to said chambers;
said control chamber is located above said diaphragm;
said output chamber is located below said diaphragm; and
said exhaust port is located below said diaphragm with the weight of the diaphragm normally closing same on the exhaust port.

29. The improvement of claim 29, including a spring acting against said diaphragm to urge same toward said exhaust port.

30. In an air distribution system having a duct receiving conditioned air at a relatively high supply pressure, a plurality of outlets in said duct for discharging the conditioned air therefrom, a pressure responsive actuator for each outlet controlling the discharge of air therefrom, a pneumatic control circuit for each actuator controlling the pressure condition thereof, and a thermostat controlling the pressure in each control circuit in accordance with the temperature sensed in the space containing the thermostat, the improvement comprising:
a pneumatic pressure regulator having a housing containing a flexible diaphragm separating the housing into a control chamber on one side of the diaphragm and an output chamber on the other side of the diaphragm, said control and output chambers being connected by a conduit having an orifice therein restricting flow through the conduit;
an exhaust port for exhausting pressure from said output chamber when open, said exhaust port being normally closed by said diaphragm and being open when the pressure differential between said output and control chambers exceeds a predetermined level sufficient to displace the diaphragm from said port;
means for supplying a pressure signal to said output chamber to provide operating power to said regulator; and a passage extending from said control chamber for venting same, said thermostat being disposed in said passage and acting to restrict same in accordance with the temperature sensed by the thermostat; and an output line extending from said output chamber and communicating with each control circuit, whereby to apply a regulated pressure on the output line for controlling each control circuit in accordance with the temperature sensed by said thermostat.

31. The improvement of claim 30, including drive open means for overriding said thermostat in a manner to effect a condition for each actuator wherein all outlets are fully open in an active condition of said drive open means.

32. The improvement of claim 31, including drive closed means for overriding said thermostat in a manner to effect a condition of each actuator wherein all outlets are fully closed in an active condition of said drive closed means.

33. The improvement of claim 30, including drive closed means for overriding said thermostat in a manner to effect a condition of each actuator wherein all outlets are fully closed in an active condition of said drive closed means.

34. The improvement of claim 30, wherein said pressure signal supplying means comprises:

a second pneumatic pressure regulator having a housing containing a flexible diaphragm separating the housing into a control chamber on one side of the diaphragm and an output chamber on the other side of the diaphragm, said control and output chambers being connected by a conduit having an orifice therein restricting flow through the conduit;

an exhaust port for said second regulator for exhausting pressure from the output chamber thereof when open, said exhaust port being normally closed by said diaphragm and being open when the pressure differential between said output and control chambers exceeds a predetermined level sufficient to displace the diaphragm from said port;

a vent passage extending from said control chamber of the second regulator;

a supply line applying pressure to said output chamber of the second regulator;

an output line extending from said output chamber of said second regulator to said output chamber of the first mentioned regulator to apply said pressure signal to the latter;

normally closed valve means in said vent passage having a normally closed condition blocking said vent passage to effect substantially equal pressures in said control and output chambers of the second regulator, thereby normally applying said pressure signal at a level substantially equal to the pressure in said supply line; and drive open means for selectively effecting an open condition of said valve means to vent said vent passage to atmosphere and effect a minimum pressure in said output line of the second regulator, whereby said minimum pressure is transmitted to the output chamber of the first regulator and to said control circuits to effect a condition of each actuator fully opening each outlet regardless of the condition of the thermostat.

35. The improvement of claim 34, including:

a third pneumatic pressure regulator having a housing containing a flexible diaphragm separating the housing into a control chamber on one side of the diaphragm and an output chamber on the other side of the diaphragm, said control and output chambers being connected by a conduit having an orifice therein restricting flow through the conduit;

an exhaust port for said third regulator for exhausting pressure from the output chamber thereof when open, said exhaust port being normally closed by said diaphragm and being open when the pressure differential between said output and control chambers exceeds a predetermined level sufficient to displace the diaphragm from said port;

a vent passage extending from said control chamber of the third regulator;

means for applying a preselected high pressure to said output chamber of the third regulator;

an output line extending from the output chamber of the third regulator and connecting with each control circuit in a manner to overriding thermostat and effect a fully closed condition of each outlet when said high pressure is transmitted to said output line of the third regulator;

normally open valve means in said vent passage of the third regulator having a normally open condition venting same to atmosphere to thereby normally effect a minimum pressure level in said output line of the third regulator; and drive closed means for selectively effecting a closed condition of said normally open valve means to block said vent passage of the third regulator, thereby effecting transmission of said high pressure through said output chamber of the third regulator to said output line of the third regulator to effect the fully closed condition of each outlet regardless of the condition of the thermostat.

36. The improvement of claim 30, including a second pneumatic pressure regulator having a housing containing a flexible diaphragm separating the housing into a control chamber on one side of the diaphragm and an output chamber on the other side of the diaphragm, said control and output chambers being connected by a conduit having an orifice therein restricting flow through the conduit;

an exhaust port for said third regulator for exhausting pressure from the output chamber thereof when open, said exhaust port being normally closed by said diaphragm and being open when the pressure differential between said output and control chamber exceeds a predetermined level sufficient to displace the diaphragm from said port;

a vent passage extending from said control chamber of the second regulator;

means for applying a preselected high pressure to said output chamber of the second regulator;

an output line extending from the output chamber of the second regulator and connecting with each control circuit in a manner to override the thermostat and effect a fully closed condition of each outlet when said high pressure is transmitted to said output line of the second regulator;

normally open valve means in said vent passage of the second regulator having a normally open condition venting same to atmosphere to thereby normally effect a minimum pressure level in said output line of the second regulator; and drive closed means for selectively effecting a closed condition of said normally open valve means to block said vent passage of the second regulator, thereby effecting transmission of said high pressure through said output chamber of the second regulator to said output line of the second regulator to effect the fully closed condition of each outlet regardless of the condition of the thermostat.

37. A pneumatic pressure regulator comprising:
a diaphragm having opposite sides;
a substantially enclosed control chamber on one side of said diaphragm;
a substantially enclosed output chamber on the other side of said diaphragm;
a conduit providing communication between said control and output chambers;
a flow restriction in said conduit restricting flow therethrough;
an exhaust port for exhausting pressure from said output chamber when pen, said exhaust port normally being closed by said diaphragm with the pressure in said output chamber urging said diaphragm in a direction to close said exhaust port;
a passage extending from said control chamber for venting same;
variable restriction means in said passage for restricting flow therethrough to an extent that is variable between a first level and a second level different from the first level;
an output line communicating with said output chamber for transmitting the pressure therein, whereby the condition of said variable restriction means establishes the pressure level in said output line;
a duct receiving conditioned air at a relatively high supply pressure and having a plurality of outlets for discharging conditioned air to different spaces served by the duct, each outlet being controlled by a pressure responsive actuator and each actuator having a pneumatic control circuit for controlling the actuator;
a pneumatic control line for each control circuit controlling same in accordance with the pressure condition of the control line;
a common thermostat for all of said spaces, said thermostat restricting said passage in accordance with the temperature sensed by the thermostat to provide said variable restriction means; and
means for connecting said output line to each of said pneumatic control lines.

38. A pneumatic pressure regulator comprising:
a substantial enclosed housing;
a flexible diaphragm in said housing separating same into a control chamber above the diaphragm and an output chamber below the diaphragm;
a conduit extending between said control and output chambers and having a flow restricting orifice therein;
an exhaust port for said output chamber for exhausting pressure therefrom when open, said port being located below said diaphragm with the weight of the diaphragm closing said port unless the pressure in said output chamber exceeds the pressure in said control chamber sufficiently to overcome the weight of the diaphragm and thereby displace same from the exhaust port to open the latter;
a passage extending from said control chamber for bleeding pressure therefrom;
an adjustable orifice in said passage, said orifice presenting an effective size which is adjustable between a first size and a second size;
an output line extending from said output chamber to transmit the regulated pressure therein;
a duct receiving conditioned air at a relatively high supply pressure and having a plurality of outlets for discharging conditioned air to different spaces served by the duct, each outlet being controlled by a pressure responsive actuator and each actuator having a pneumatic control circuit for controlling the actuator;
a pneumatic control line for each control circuit controlling same in accordance with the pressure condition of the control line;
a common thermostat for all of said spaces, said thermostat acting to adjust the effective size of said adjustable orifice; and
means for connecting said output line to each of said pneumatic control lines.

39. A pneumatic pressure regulator comprising:
a substantially enclosed housing;
a flexible diaphragm in said housing separating same into a control chamber above the diaphragm and an output chamber below the diaphragm;
a conduit extending between said control and output chambers and having a flow restricting orifice therein;
an exhaust port for said output chamber for exhausting pressure therefrom when open, said port being located below said diaphragm with the weight of the diaphragm closing said port unless the pressure in said output chamber exceeds the pressure in said control chamber sufficiently to overcome the weight of the diaphragm and thereby displace same from the exhaust port to open the latter;
a passage extending from said control chamber for bleeding pressure therefrom; an adjustable orifice in said passage, said orifice presenting an effective size which is adjustable between a first size and a second size;
an output line extending from said output chamber to transmit the regulated pressure therein;
a duct receiving conditioned air at a relatively high supply pressure and having a plurality of outlets for discharging conditioned air to different spaces served by the duct, each outlet being controlled by a pressure responsive actuator and each actuator having a pneumatic control circuit for controlling the actuator;
a thermostat line for each control circuit for normally controlling same;
a thermostat in each space for normally controlling the corresponding thermostat line; and
means for connecting said output line to each control circuit in parallel with the thermostat line thereof.

* * * * *